(12) United States Patent
Kemper et al.

(10) Patent No.: US 8,192,857 B2
(45) Date of Patent: Jun. 5, 2012

(54) BATTERY ASSEMBLY AND METHOD OF FORMING THE SAME

(75) Inventors: Paul Leslie Kemper, Frankton, IN (US); Derrick Scott Buck, Pendleton, IN (US); Bruce James Silk, Boca Raton, FL (US)

(73) Assignee: EnerDel, Inc., Indianapolis, IN (US)

( * ) Notice: Subject to any disclaimer, the term of this patent is extended or adjusted under 35 U.S.C. 154(b) by 1461 days.

(21) Appl. No.: 11/713,943

(22) Filed: Mar. 5, 2007

(65) Prior Publication Data

US 2007/0207349 A1   Sep. 6, 2007

Related U.S. Application Data

(60) Provisional application No. 60/779,099, filed on Mar. 4, 2006.

(51) Int. Cl.
*H01M 2/14* (2006.01)
*H01M 2/00* (2006.01)
*H01M 2/01* (2006.01)

(52) U.S. Cl. ........ 429/129; 429/131; 429/132; 429/136; 429/138; 429/163; 429/167; 429/177; 429/180

(58) Field of Classification Search ........................ None
See application file for complete search history.

(56) References Cited

U.S. PATENT DOCUMENTS

| | | |
|---|---|---|
| 5,639,571 A | 6/1997 | Waters et al. |
| 6,120,935 A | 9/2000 | Van Lerberghe |
| 6,368,743 B1 | 4/2002 | Guerin et al. |
| 2002/0045096 A1 | 4/2002 | Sandberg |
| 2004/0115519 A1 | 6/2004 | Lee |
| 2005/0089751 A1 | 4/2005 | Oogami et al. |
| 2005/0123828 A1* | 6/2005 | Oogami et al. ............... 429/152 |
| 2005/0271934 A1 | 12/2005 | Kiger et al. |

\* cited by examiner

*Primary Examiner* — Barbara Gilliam
*Assistant Examiner* — Angela Martin
(74) *Attorney, Agent, or Firm* — Faegre Baker Daniels LLP

(57) ABSTRACT

A battery assembly includes a first cell and a second cell adjacent the first cell. A first insulator and a second insulator extend over and encapsulate first electrode and second electrode. A shell extends over the first and second insulators thereby encapsulating the first and second insulators. A mechanical connection is defined between the first insulator of the fist cell and the second insulator of the second cell.

23 Claims, 4 Drawing Sheets

BATTERY ASSEMBLY AND METHOD OF FORMING THE SAME

RELATED APPLICATIONS

This application claims priority to The U.S. Provisional Patent Application Ser. No. 60/727,779 filed Mar. 4, 2006, which is hereby incorporated by reference.

FIELD OF THE INVENTION

The subject invention relates to battery packs, and more particularly to rechargeable battery pack assembly having electrical and mechanical components arranged to reduce overall battery pack size and increase reliability and improve safety characteristics.

BACKGROUND OF THE INVENTION

Motor vehicles, such as, for example, hybrid vehicles use multiple propulsion systems to provide motive power. This most commonly refers to gasoline-electric hybrid vehicles, which use gasoline (petrol) to power internal-combustion engines (ICEs), and electric batteries to power electric motors. These hybrid vehicles recharge their batteries by capturing kinetic energy via regenerative braking. When cruising or idling, some of the output of the combustion engine is fed to a generator (merely the electric motor(s) running in generator mode), which produces electricity to charge the batteries. This contrasts with all-electric cars which use batteries charged by an external source such as the grid, or a range extending trailer. Nearly all hybrid vehicles still require gasoline as their sole fuel source though diesel and other fuels such as ethanol or plant based oils have also seen occasional use.

Batteries and cells are important energy storage devices well known in the art. The batteries and cells are typically comprised of electrodes and an ion conducting electrolyte positioned therebetween. For example, the rechargeable lithium ion cell, typically comprises essentially two electrodes, an anode and a cathode, and a non-aqueous lithium ion conducting electrolyte therebetween. The anode (negative electrode) can be a carbonaceous, or metallic, or metal alloy electrode that is capable of intercalating lithium ions. The cathode (positive electrode), a lithium retentive electrode, is also capable of intercalating lithium ions. The anode comprises any of the various materials such as carbon (e.g., graphite, coke, carbon fiber, etc.), mixed metal oxides (such as $Li_4Ti_5O_{12}$ or silicon oxide), metals (such as Si or Sn), metal alloy (such as Si/Sn alloys) which are capable of reversibly storing lithium species, and which are bonded to an electrically conductive current collector (e.g., copper foil) by means of a suitable organic binder (e.g., polyvinylidine fluoride, PVdF). The cathode comprises such materials as transition metal oxides or chalcogenides that are bonded to an electrically conducted current collector (e.g., aluminum foil) by a suitable organic binder. Oxide of chalcogenide compounds include oxides, sulfides, selenides, and tellurides of such metals as vanadium, titanium, chromium, copper, molybdenum, niobium, iron, nickel, cobalt, and manganese. Lithiated transition metal oxides are, at present, the preferred positive electrode intercalation compounds.

Examples of suitable cathode materials include $LiMnO_2$, $LiCoO_2$, $LiNiO_2$, and $LiFePO_4$, their solid solutions and/or their combination with other metal oxides and dopant elements, e.g., titanium, magnesium, aluminum, boron, etc. The electrolyte in such lithium ion cells comprises a lithium salt dissolved in a non-aqueous solvent which may be (1) completely liquid, (2) an immobilized liquid (e.g., gelled or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, polyvinylidine fluorides, polyolefins such as polypropylene and polyethylene, and polycarbonates, and may be polymerized in situ in the presence of the electrolyte to trap the electrolyte therein as the polymerization occurs.

Known polymers for pure polymer electrolyte systems include polyethylene oxide (PEO), polymethylene-polyethylene oxide (MPEO), or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, $LiCF_3CO_2$, LiBOB, $LiAsF_6$, and $LiSbF_6$. Known organic solvents for the lithium salts include, for example, both cyclic and linear carbonate esters (such as propylene carbonate, ethylene carbonate, dimethyl carbonate, diethyl carbonate, and ethyl methyl carbonate), cyclic ethers, cyclic esters, glymes, cyclic esters, formates, esters, sulfones, nitrates, and oxazoladinones. The electrolyte is incorporated into pores in a separator layer between the anode and the cathode. The separator layer may be either a microporous polyolefin membrane or a polymeric material containing a suitable ceramic or ceramic/polymer material.

The art is replete with various designs of conventional lithium batteries, which present a polymer soft pack batteries that uses prismatic or cylindrical cans or rectangular boxes as a package for the battery cells as seen by reference to the U.S. Pat. No. 5,639,571 to Waters, et al.; U.S. Pat. No. 6,120,935 to Van Lerberghe; U.S. Pat. No. 6,368,743 to Guerin et al. and the United States Patent Publication Nos. 2002/0045096 to Sandberg et al.; 20050123828 to Oogami et al.; 20050271934 to Kiger et al.; and 20040115519 to Lee et al. disclose other designs of battery packs.

The United States Patent Publication No. 20050271934 to Kiger et al. teaches a low-profile battery pack having an electrolyte barrier. The pack includes a plurality of rechargeable cylindrical cells, being arranged in end to end pairs of two cells. A cleavage void formed by the convex geometry of the cells accommodates at least one insulator and a first circuit board. Tabs couple the cells to the first circuit board. A flexible substrate couples the first circuit board to a second circuit board. The assembly is then placed in a housing having a first compartment and a second compartment, such that the cells are placed in the first compartment and the second circuit board is placed in the second compartment. Between the first and second compartments exists an electrolyte barrier.

Due to this adjacent arrangement, the aforementioned cleavage void is formed between the intersection line and a plane running across the top of each cell so as to be tangent to the convex curvature of each cell. The cleavage void is essentially a triangular shaped space, where the triangle has two concave sides. Alluding to the above, the insulator taught by the United States Patent Publication No. 20050271934 to Kiger et al. is a plastic member that has a geometric cross-section that fits within the cleavage space. The cross sectional shape is generally triangular, with two of the sides having concave curvatures to mate between a pair of cylindrical cells. The insulator is a separate element and is not an integral part of the cells. The insulator taught by the United States Patent Publication No. 20050271934 to Kiger et al. is specific to the cells having circular configuration.

The United States Patent Publication No. 20050123828 to Oogami et al. teaches a unit cell, formed in a flat shape in the presently filed embodiment, internally includes an electric power generating element comprised of a positive electrode plate, a negative electrode plate and a separator, all of which are stacked in such order. The unit cell forms a secondary battery, such as a lithium ion secondary battery, employing a gel polymer electrolyte. With the unit cell, a laminate film with a three-layer structure is used as an outer sheath and formed in three layers that include an aluminum foil interposed between resin films each made of polyamide resin.

Alluding to the above, the unit cell has the positive electrode tab and the negative electrode tab as tabs forming output terminals extending in a direction perpendicular to the stack direction. The positive electrode tab and the negative electrode tab are extracted outside an outer sheath. Formed in the positive electrode tab and the negative electrode tab, respectively, are holes, to which insulator pins, each having a surface subjected to insulation treatment, are inserted. The unit cells are alternately stacked such that the electrode tabs have positive and negative polarities alternately arranged in the stack direction, i.e., the positive electrode tab and the negative electrode tab are alternately stacked. The electrically conductive washers and the insulation washes are alternately set through the insulator pins such that the positive electrode tabs and the negative electrode tabs are sandwiched. In particular, the insulation washer is interposed between the positive electrode tab and the negative electrode tab layered thereon, and the electrically conductive washer is interposed between the negative electrode tab and the positive electrode tab layered thereon.

The insulation washer is placed on the positive electrode tab and the electrically conductive washer is placed on the negative electrode tab. Incidentally, although the electrically conductive washer and the insulation washer are located on the positive electrode tab and the negative electrode tab of the unit cell remaining in the uppermost layer, respectively, in dependence on a sequence in which the electrode tabs are arranged, it doesn't matter if these component parts are dispensed with depending on circumstances. Similar to the unsulator taught by the United States Patent Publication No. 20050271934 to Kiger et al., the insulator of the United States Patent Publication Nos. 20050123828 to Oogami et al. present a separate element, which is not an integral part of the cells.

The United States Patent Publication Nos. 20050123828 to Oogami et al. and 20050271934 to Kiger et al. present several disadvantages such as failure to provide a battery assembly with self-locating mechanical elements aimed to increase structural integrity of the battery assembly required while individual cells of the battery assembly are transported between various locations and do not reduce the weight of the battery assembly.

But even to the extend of being effective in certain respects, there is a constant need in the area of the battery art for an improved design of a battery pack having effective packaging characteristics, structural integrity thereby eliminating problems associated with current designs of prior art battery packs.

SUMMARY OF THE INVENTION

A battery assembly of the present invention is adaptable to be utilized in various configurations including and not limited to an overlapping battery cell packaging configuration and a vertical stack battery cell packaging configuration. The battery assembly includes a first cell and a second cell adjacent the first cell. Each first and second cells have a first electrode adjacent a first current collector and a second electrode of the charge opposite from the first electrode and adjacent a second current collector.

A separator layer is positioned between the first and second electrodes with the first and second electrodes conducting electrolyte therebetween. A first insulator and a second insulator extend over and encapsulate the first electrode and the second electrode. A shell extends over the first and second insulators thereby encapsulating the first and second insulators. The shell terminates into a negative terminal and a positive terminal opposed the negative terminal.

A plurality of contacts, spaced from one another, are defined in each of the positive and negative terminals. The first and second cells present a mechanical connection defined therebetween. The mechanical connection presents a boss integral with and extending outwardly from the first insulator of the first cell through one of the contacts and beyond the shell of the first cell to mechanically engage a seat defined by the second insulator of the second cell as a tie rod or stud extends transversely through each contact thereby preventing relative movement between the first and second cells.

An advantage of the present invention is to provide a battery assembly presenting a self-locating mechanical connection that increases structural integrity of the battery assembly required while individual cells of the battery assembly are transported between various locations.

Another advantage of the present invention is to provide a battery assembly having efficient packaging characteristics.

Still another advantage of the present invention is to provide a battery assembly that reduces the weight by eliminating connecting hardware such as electrical studs and the like.

Still another advantage of the present invention is to provide a battery assembly that reduces manufacturing costs due to simplified assembly pattern.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts, a battery assembly or a battery pack of the present invention is generally shown at 10. Preferably, the battery pack 10 includes four rows, generally indicated at 12, of battery cells (the cell), generally indicated at 14, connected with and extending along each row 12 in overlapping relationship. Each row 12 includes five stacks of the cells 14. Each stack of the cells 14 are interconnected with one another in the pattern known to those skilled in the battery art and extend along each row 12 in overlapping relationship with one another. The battery pack 10 is supported by and connected to a tray 16 formed from a polymeric material. A battery pack 10 of the present invention is adaptable to be utilized in various configurations including and not limited to an overlapping battery cell packaging configuration, as illustrated in FIGS. 1, 3, 4, and 6, a vertical stack battery cell packaging configuration, as illustrated in FIGS. 2 and 5.

Each cell 14 includes a plurality of battery components (not shown) co-acting between one and the other conducting electrolyte therebetween as known to those skilled in a lithium battery art. A first electrode is adjacent a first current collector and a second electrode of charge opposite from the first electrode is adjacent a second current collector. A separator layer is positioned between the first and second electrodes with the first and second electrodes conducting electrolyte therebetween.

Figure 1:
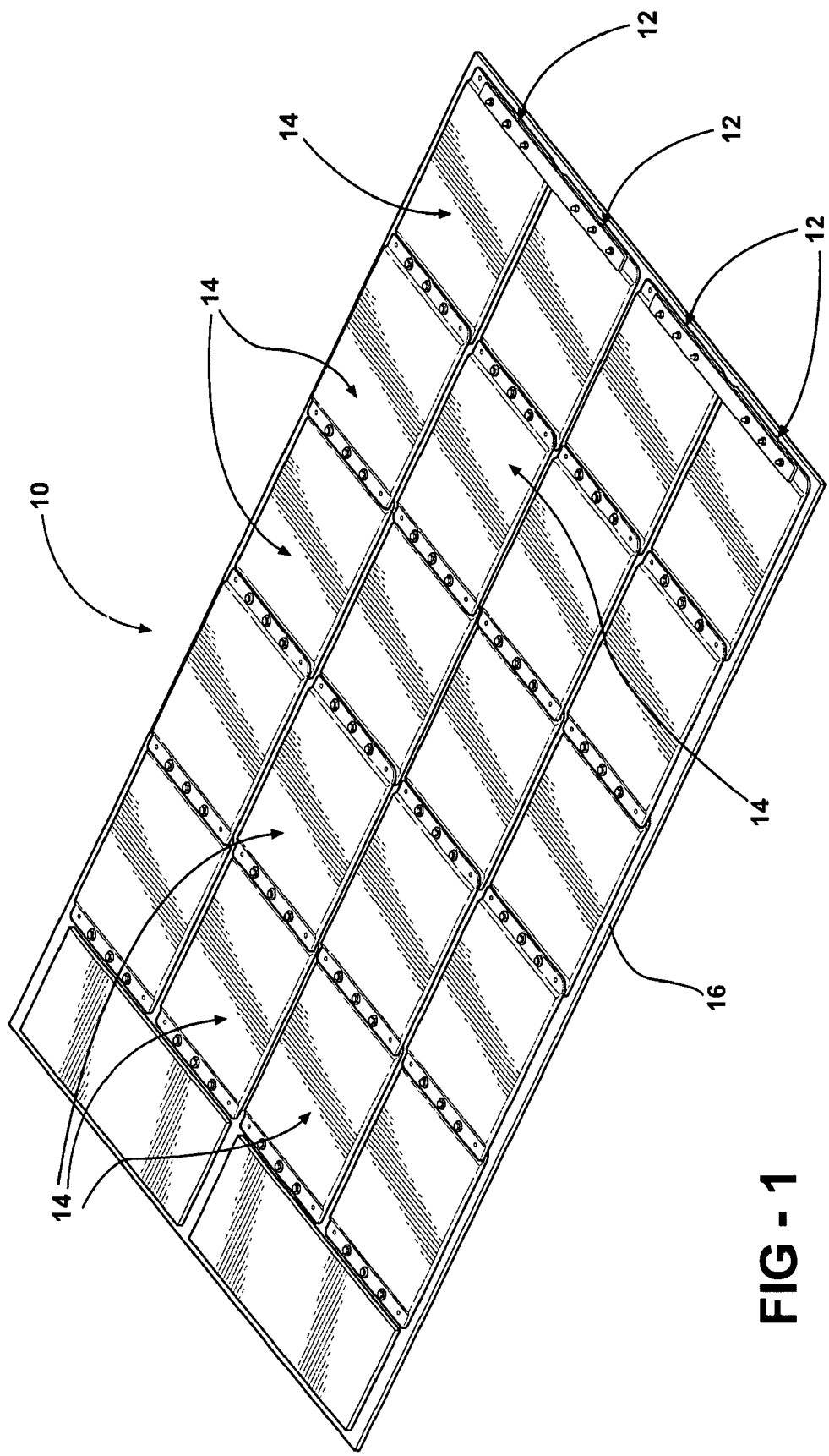
FIG. 1 is a perspective view of adjacent battery cells supported by a tray and interconnected with a tie nut or stud.
Figure 2:
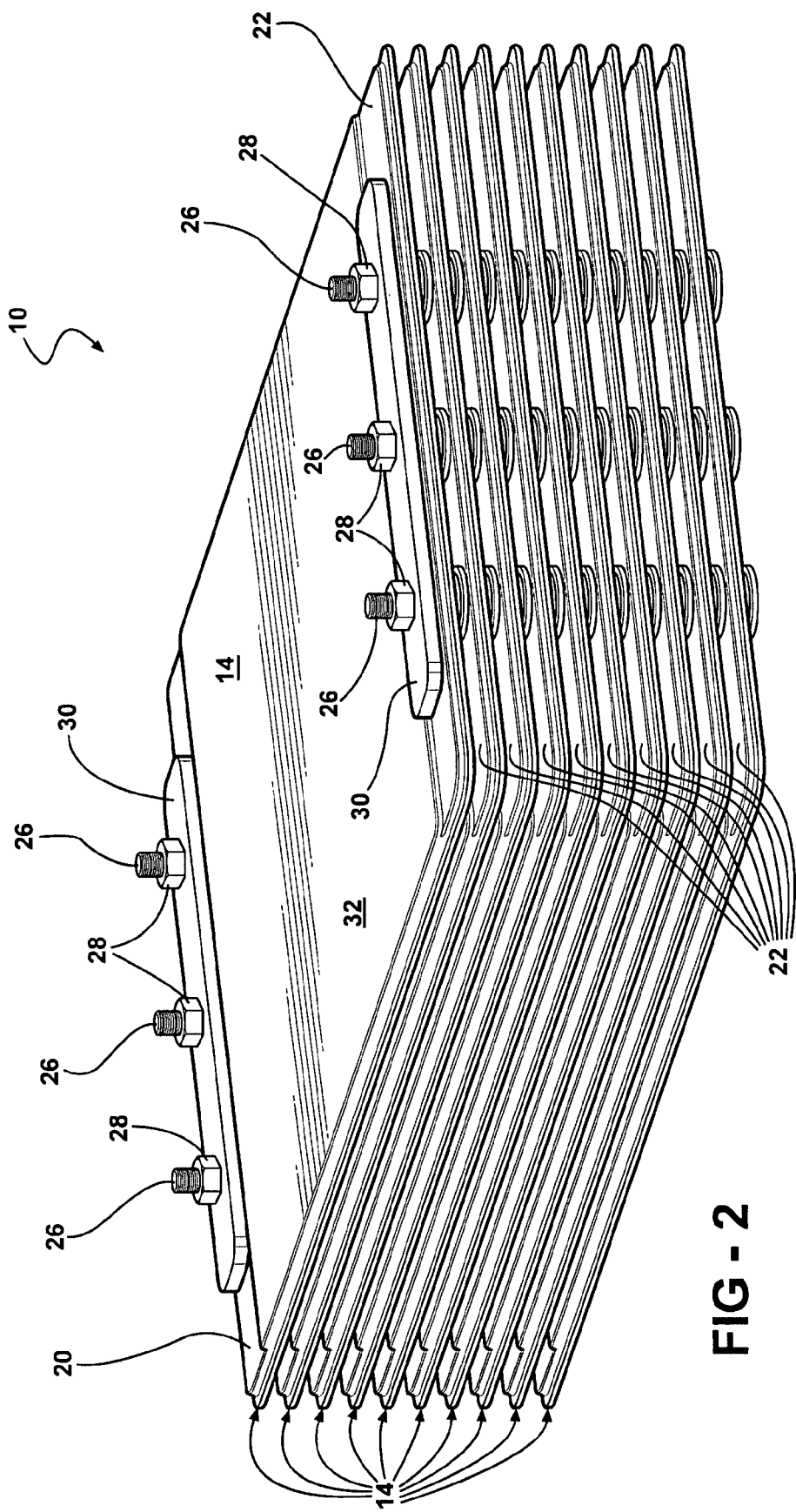
FIG. 2 is a side view of the vertical stack battery cell packaging embodiment of the present invention.
Figure 4:
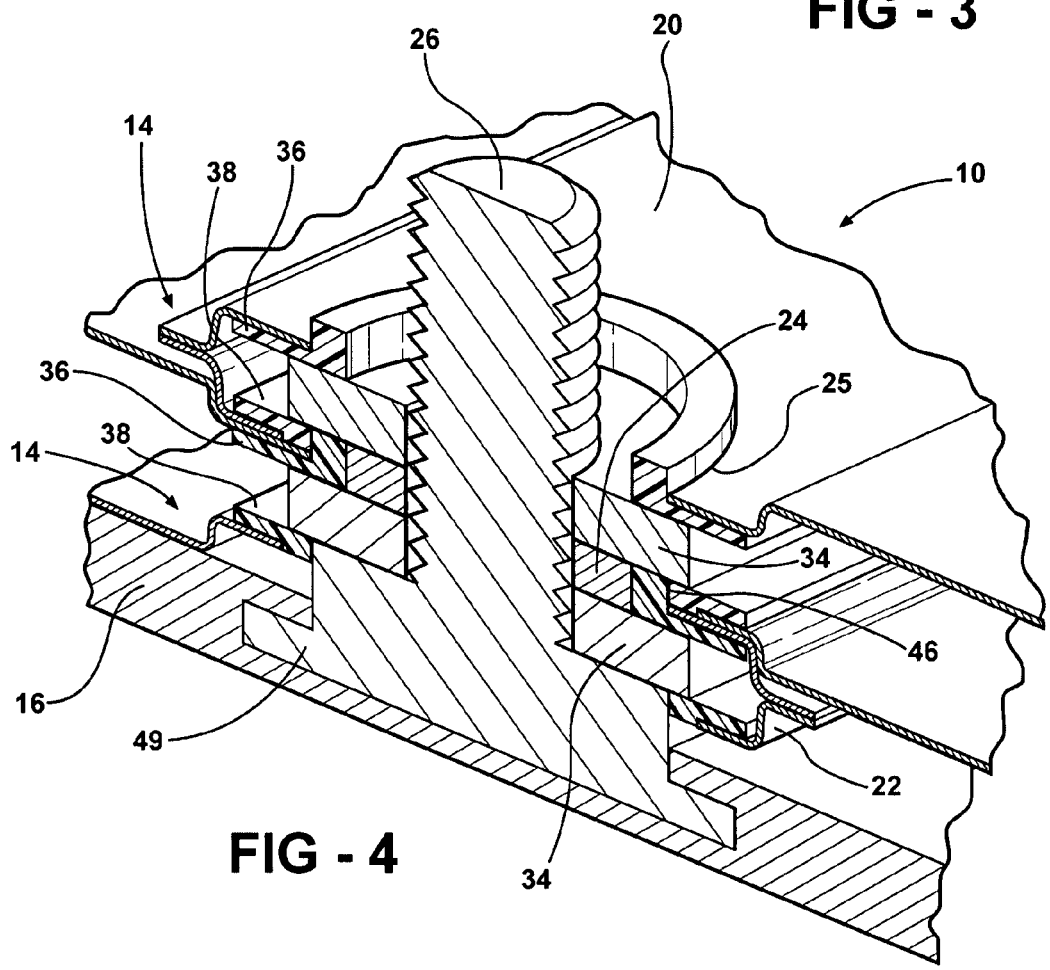
FIG. 4 is a partial perspective and cross sectional view of the battery cells shown in FIG. 3 illustrating a boss and a seat of the inventive mechanical connection of each cell of the present invention.
Figure 5:
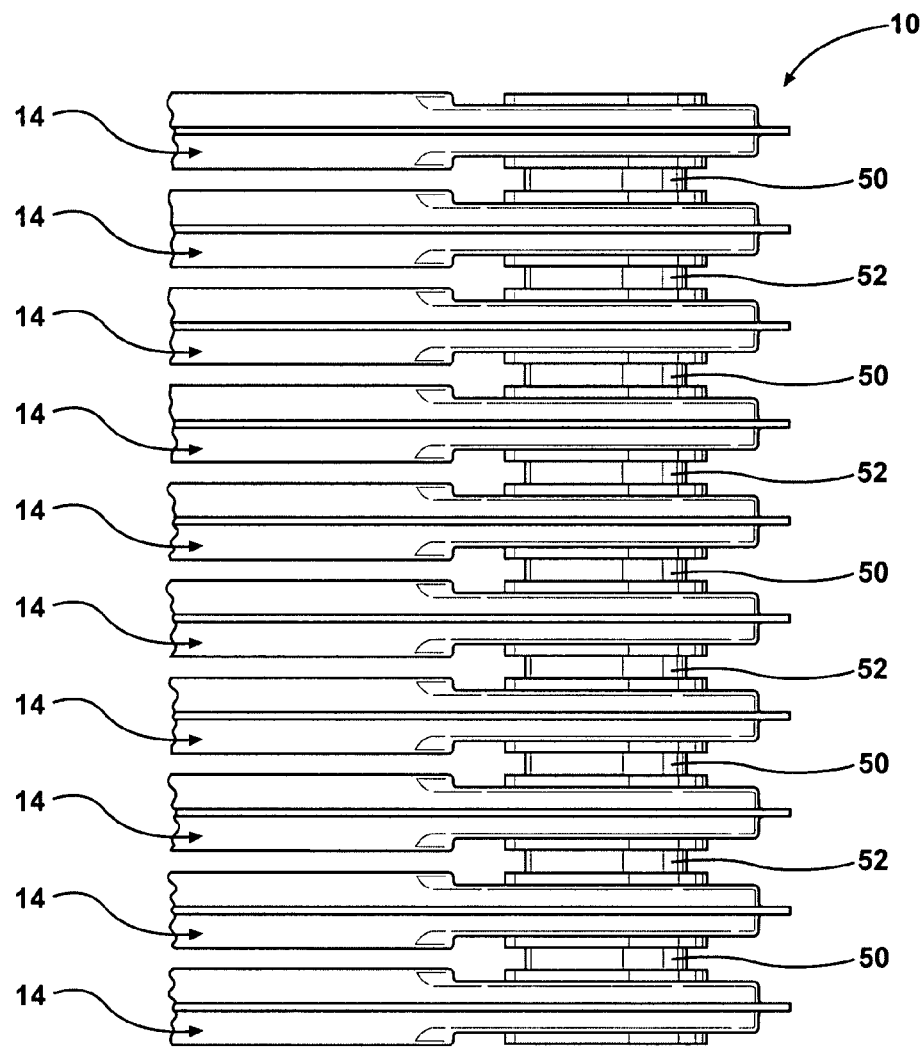
FIG. 5 is a perspective view of a vertical stack battery cell packaging embodiment of the present invention.
Figure 6:
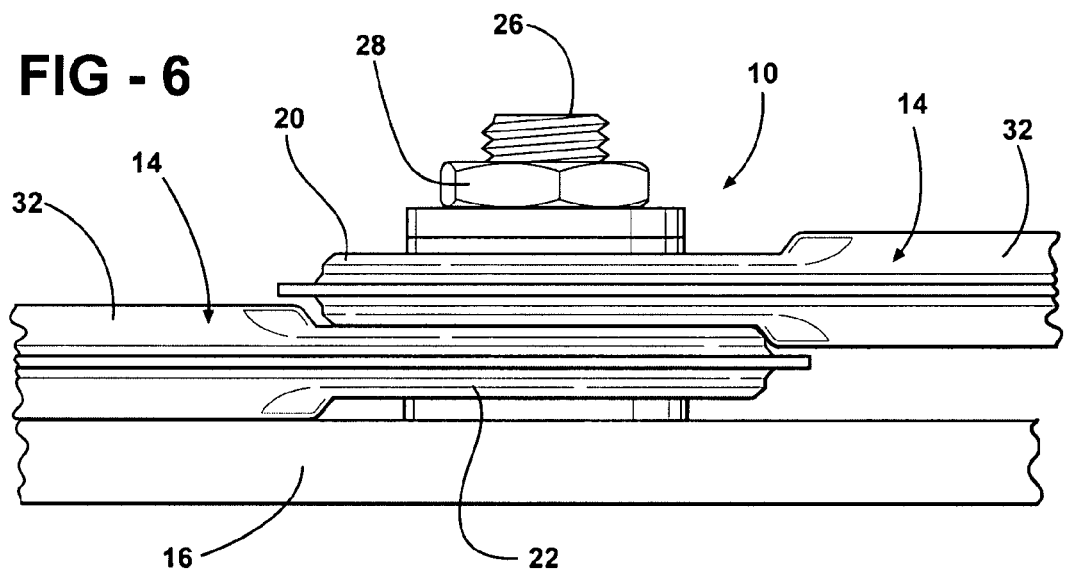
FIG. 6 is a perspective view of an overlapping battery cell packaging embodiment of the present invention.

As best illustrated in FIGS. 2, 4 and 6, each battery cell 14 presents at least one positive terminal lip 20 and at least one negative terminal lip 22. Three electrical contacts are provided for each polar contact to divide the current carrying capacity and to provide auxiliary paths for current flow in the event that one or more contacts 24, as shown in FIG. 4, would develop high resistance or electrically open. Each contact 24 is further defined by an aperture or opening 25 defined in each terminal lip 20 and 22 includes extending therethrough to provide the means to guide the cells 14 over electrical studs or tie rods 26. The contacts 24 are also provided with an electrical insulator (to be discussed as the description of the present invention proceeds) that extends outside the cell case or shell. The insulators are designed to ensure that the cells 14, when stacked or overlapped, are mechanically interlocked to provide structural integrity.

The stud or the tie rod 26 extends through each opening 24 at each of the terminal lips 20 and 22 and is secured by a nut 28 in a vertical stack as shown in FIG. 2. A cover strip 30 extends along each of the upper negative terminal lip 22 and positive terminal lip 20 and between each nut 28 to distribute pressure generated by mechanical connection of the tie rod 26 and the nut 28. The positive and negative electrical contacts of the cell are exposed on both sides of the cell 14.

As illustrated in FIGS. 2, 4 and 6, each cell 14 includes a shell 32 or packaging envelope formed from a sheet of packaging material, such as aluminum, which is placed under the aforementioned cell components including an individual cell busbar or tab and cell terminal 34 and a remaining part of the packaging shell is folded over the battery core to form the aforementioned shell 32. Preferably, the shell 30 defines a vent (not shown) designed to function as an escape port or outlet for releasing any gas concentrated in the shell 32 due to overcharging or other conditions of the cell 14. Those skilled in the lithium battery art will appreciate that the shell 30 may also be fabricated from any other suitable materials without limiting functional characteristics of the present invention.

Figure 3:
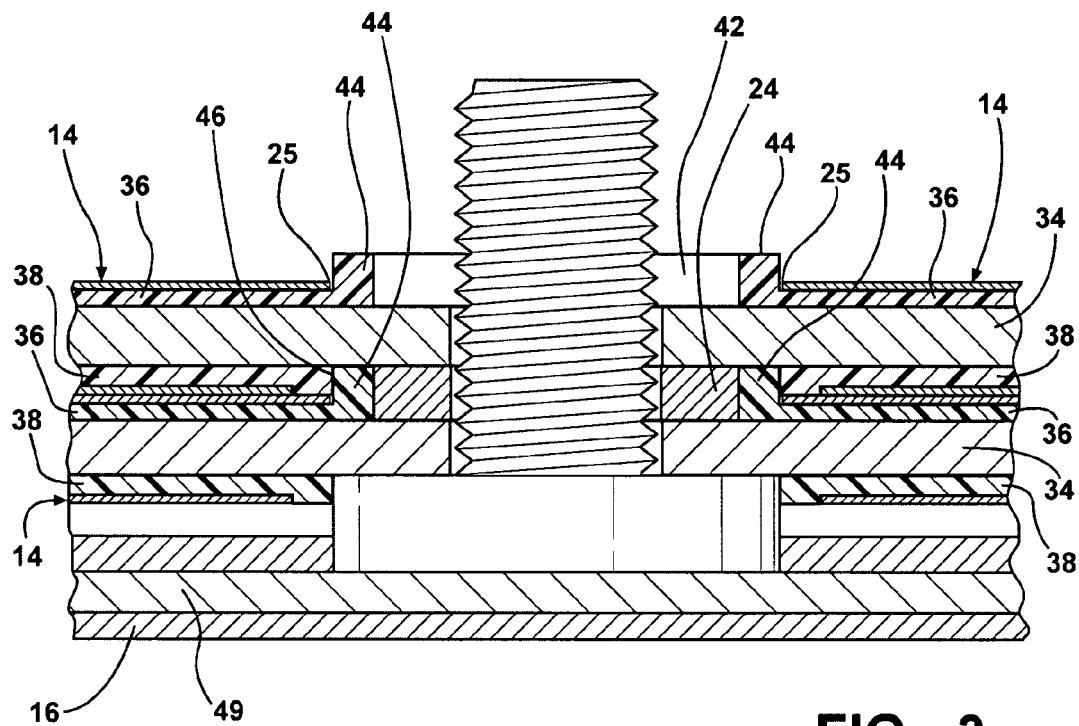
FIG. 3 is a fragmental and cross sectional view of the adjacent battery cells showing the inventive mechanical connection defined by self-locating features presented between two adjacent battery cells.

As best illustrated in FIGS. 3 and 4, a first or upper insulator 36 and a second or lower insulator 38, both formed from a polymeric material, extend over and encapsulate the first electrode tab and the second electrode tab. The shell 32 extends over the first and second insulators 36 and 38 thereby encapsulating the first and second insulators 36 and 38. The shell 32 terminates into a negative terminal and a positive terminal opposed the negative terminal, i.e. the positive terminal lip 20 and at least one negative terminal lip 22, respectively. A plurality of the contacts 24 spaced from one another are defined in each of the positive and negative terminal lips 20 and 22.

The cells 14 present a mechanical connection defined therebetween and used in all of the packaging configurations as described above. A boss 44 is homogeneously integral with and extends outwardly from the upper insulator 36 surrounding the contacts 24. In particular, the boss 44 of the first insulator 36 of one of the cells 14 extends through one of the contacts defined by the contacts 24 and beyond the shell 32 of the first cell to mechanically engage a seat or nest 46 defined by the second insulator 38 of the adjacent cell 14 as the tie rod or stud 26 extends transversely through each contact 24 thereby preventing relative movement between the cells 14 to form the vertical stack or overlapping set of the cells 14. The outer diameter of the boss 44 is smaller the inner diameter of the nest 46 to allow male and female type of engagement between adjacent cells 14. Alternatively, the second insulator 38 may also include a boss (not shown) homogeneously integral with and extending outwardly from the second insulator 38 and beyond the opening 42 of the shell 32 surrounding the contacts 24. As such, the boss 44 of one cell 14 will frictionally engage the boss of another cell 14.

As illustrated in FIGS. 3 and 4, the tray 16 utilizes overmolded conductive traces or mono-block busbars 49 or lines connected to each stud 26 thereby transmitting a bussing power and communications from the electrical string of battery cells 14 to a remote electronic controller (not shown). Various connecting patterns such as Zig-Zag, U-shaped, and S-shaped are utilized to conduct operative communication between individual stacks and cells 14 are not intended to limit the present invention. Multiple electrical contacts are used to connect bussing via connectors located on the controller.

As illustrated in FIGS. 2 and 5, as the battery assembly 10 is formed, the individual cells 14 are placed over the studs 26 at every other cell position on the tray 16. An electrically conductive disk 50 is then placed over each stud 26 until resting on each cell contact surface. Preferably, the electrically conductive disk 50 is formed from copper. The remaining cells 14 are then placed over the studs 14 in the unoccupied positions of the tray 16, overlapping the previously placed cells 14. The nut 28 is applied to each stud 26 and is torqued to apply communications from an electrical string of battery cells 14 to a remote electronic controller (not shown). The cells 14 are placed over the studs 26 at every cell position on the tray 16.

As illustrated in FIG. 5, an electrically insulating disk 52, formed from a polymeric material, is placed over the remaining studs 26, opposite polarity of where the electrically conductive disks 50 were placed. One additional cell 14 is then placed over the studs 26 at each position on the tray 16 along with the conductive and insulating disks 50 and 52 as previously described. This process is repeated until the proper number of cells 14 and the conductive and insulating disks 50 and 52 have been placed onto all cell positions of the tray 16. The nut 28 applies compression and thus creates a solid cell stack. Alternatively, foam or other polymeric material may be introduced by injection or the like into voids or clearances defined between adjacent or stacked cells 14 as the stack is formed to add to structural integrity of the stack to form an encapsulated stack.

The novelty of the present inventive concept provides numerous advantages over prior art design. The battery assembly design presenting the aforementioned mechanical and electrical interlocking interface features provides the means for safe handling of individual charged cells 14 that may be vertically stacked or overlapped in multiple cell; series or parallel, configurations, as illustrated in Figures. Another novel feature of the present design presents an innovative cell design, which is incorporated into a low profile, low mass, and efficient space configuration for packaging multiple cells 14 in series or parallel configurations. Alluding to the above, the cell terminal 34, yet sub-flush of the cell shell nearly eliminate the risk of short circuiting during manufacturing or any means of individual cell transport. The inventive battery assembly provides an efficient manufacturing process directed to reduce the need for costly sophisticated assembly equipment thereby promoting labor efficient and cost effective packaging configurations and reductions in pack mass.

The inventive concept of the present invention provides other advantages over the prior art. One of these advantages provides a battery assembly presenting a self-locating mechanical connection that increases structural integrity of the battery assembly required while individual cells of the battery assembly are transported between various locations. Still another advantage of the present invention is to provide a battery assembly having efficient packaging characteristics. Still another advantage of the present invention is to provide a battery assembly that reduces the weight by eliminating connecting hardware such as electrical studs and the like. Still another advantage of the present invention is to provide a battery assembly that reduces manufacturing costs due to simplified assembly pattern While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery assembly comprising:
    a first having a cell core encapsulated by a first shell;
    a second cell having a cell core encapsulated by a second shell with said second cell positioned adjacent said first cell;
    a first insulator and a second insulator of said first cell and said second cell sandwiching said cell core and said second cell core therebetween with said first and second insulators of said first cell and said second cell being carried by and at least partially encapsulated by said first shell and said second shell; and
    a mechanical connection defined between said first cell and said second cell as said first insulator carried by said first shell extends outwardly from and beyond said first shell to mechanically engage said second insulator carried by said second cell thereby preventing relative movement between said first cell and said second cell.

2. A battery assembly as set forth in claim 1 wherein said first cell and said second cell are stacked on top of one another.

3. A battery assembly as set forth in claim 1 wherein said first cell and said second cell are engaged in overlapping relationship.

4. A battery assembly as set forth in claim 1 wherein each core of said first cell and said second cell is further defined by a first electrode and a second electrode of charge opposite from said first electrode and a separator layer positioned between said first and second electrodes with said first and second electrodes conducting electrolyte therebetween.

5. A battery assembly as set forth in claim 1 wherein each of said first shell and said second shell terminates into a negative terminal and a positive terminal opposed said negative terminal with each of said positive an negative terminals defining at least one contact aperture defined therein.

6. A battery assembly as set forth in claim 5 wherein said mechanical connection is further defined by at least one boss integral with and extending outwardly from said first insulator of said first cell through said at least one contact aperture and beyond said first shell of said first cell.

7. A battery assembly as set forth in claim 6 wherein said mechanical connection is further defined by at least one seat defined by said second insulator of said second cell for mechanically engaging in a male-female fashion said at least one boss extending outwardly from said first insulator of said first cell thereby preventing relative movement between said first and second cells and provide structural integrity therebetween.

8. A battery assembly as set forth in claim 7 wherein said at least one boss present a circular configuration and said at least one seat present a circular configuration to complement with said at least one boss.

9. A battery assembly as set forth in claim 8 including a tray for engaging said first cell and said second cell and a pin extending from said tray through said at least one contact aperture of said first cell and said second cell.

10. A battery assembly as set forth in claim 9 wherein said first insulator and said second insulator are fabricated from a polymeric material.

11. A battery assembly having at least two cells each having a core of at least one positive electrode and at least one negative electrode, said battery assembly comprising:
    a first housing for encapsulating the negative and positive electrodes of one of the cells and a second housing for encapsulating the negative and positive electrodes of another cell;
    a first pair of insulators carried by said first housing and a second pair of insulators carried by said second housing with said first and second pairs of insulators being at least partially encapsulated by said first and second housings; and
    a mechanical connection defined between said first housing and said second housing as a first portion of said first pair of insulators extends outwardly from and beyond said first housing to mechanically engage a second portion of said second pair of insulators of said second housing thereby preventing relative movement between said first housing and said second housing.

12. A battery assembly as set forth in claim 5 wherein said mechanical connection is further defined by at least one stud extending through said at least one contact aperture of each of said negative and positive terminals.

13. A battery assembly as set forth in claim 12 wherein said mechanical connection is further defined by at least one cover strip positioned adjacent said negative and positive terminals of at least one cell, wherein said studs extend through holes disposed within said cover strips.

14. A battery assembly as set forth in claim 13 wherein said mechanical connection is further defined by at least one fastening member positioned adjacent said cover strips for each of said studs and configured to be engaged with said studs.

15. A battery assembly as set forth in claim 11 wherein each core of said at least two cells is further defined by a first electrode and a second electrode of charge opposite from said first electrode and a separator layer positioned between said first and second electrodes with said first and second electrodes conducting electrolyte therebetween.

16. A battery assembly as set forth in claim 11 wherein each of said first housing and said second housing terminates into a negative terminal and a positive terminal opposed said negative terminal with each of said positive and negative terminals defining at least one contact aperture defined therein.

17. A battery assembly as set forth in claim 16 wherein said mechanical connection is further defined by at least one boss integral with and extending outwardly from said first insulator through said at least one contact aperture and beyond said first housing.

18. A battery assembly as set forth in claim 17 wherein said mechanical connection is further defined by at least one stud extending through said at least one contact aperture of each of said negative and positive terminals.

19. A battery assembly as set forth in claim 18 wherein said mechanical connection is further defined by at least one cover strip positioned adjacent each of said negative and positive terminals, wherein said studs extend through holes disposed within said cover strips.

20. A battery assembly as set forth in claim 19 wherein said mechanical connection is further defined by at least one fastening member for each of said studs configured to be engaged with said studs.

21. A battery assembly as set forth in claim 16 wherein said mechanical connection is further defined by at least one seat defined by said second insulator of said second cell for mechanically engaging in a male-female fashion said at least one boss extending outwardly from said first insulator thereby preventing relative movement between said at least two cells and provide structural integrity therebetween.

22. The battery assembly of claim 1, further comprising a tray, wherein the first cell and the second cell are part a plurality of cells supported by the tray, the first cell, the second cell, and a third cell being arranged end-to-end in a row, the first cell being positioned between the second cell and the third cell, the second cell overlapping a first terminal of the first cell and the third cell overlapping a second terminal of the first cell, the second cell and the third cell being spaced-apart in a non-overlapping arrangement.

23. The battery assembly of claim 11, further comprising a tray, wherein the first cell and the second cell are part a plurality of cells supported by the tray, the first cell, the second cell, and a third cell being arranged end-to-end in a row, the first cell being positioned between the second cell and the third cell, the second cell overlapping a first terminal of the first cell and the third cell overlapping a second terminal of the first cell, the second cell and the third cell being spaced-apart in a non-overlapping arrangement.

* * * * *